United States Patent
Aoike (10) Patent No.: US 7,620,428 B2
(45) Date of Patent: Nov. 17, 2009

(54) PORTABLE TERMINAL DEVICE

(75) Inventor: Toru Aoike, Tokyo (JP)

(73) Assignee: NEC Corporation, Tokyo (JP)

( * ) Notice: Subject to any disclaimer, the term of this patent is extended or adjusted under 35 U.S.C. 154(b) by 674 days.

(21) Appl. No.: 11/065,443

(22) Filed: Feb. 25, 2005

(65) Prior Publication Data

US 2005/0197167 A1   Sep. 8, 2005

(30) Foreign Application Priority Data

Mar. 2, 2004   (JP)   ............................. 2004-057294

(51) Int. Cl.
*H04M 1/00*   (2006.01)
(52) U.S. Cl. .................. 455/567; 455/550.1; 455/3.06; 455/115.3
(58) Field of Classification Search ................. 455/567, 455/550.1, 418, 414.1, 415, 3.06, 23, 419, 455/564, 513, 123, 115.3; 379/88.19, 373.01
See application file for complete search history.

(56) References Cited

U.S. PATENT DOCUMENTS

| | | | | |
|---|---|---|---|---|
| 5,790,045 | A * | 8/1998 | Hymel et al. .............. | 340/7.58 |
| 6,658,267 | B1 | 12/2003 | Baranowski et al. | |
| 2001/0014616 | A1 | 8/2001 | Matsuda et al. | |
| 2002/0094806 | A1 * | 7/2002 | Kamimura .................. | 455/415 |
| 2003/0153365 | A1 * | 8/2003 | Heie .......................... | 455/567 |
| 2004/0067751 | A1 * | 4/2004 | Vandermeijden et al. . | 455/414.1 |
| 2004/0105532 | A1 * | 6/2004 | Nakano .................... | 379/88.22 |
| 2005/0107075 | A1 * | 5/2005 | Snyder ....................... | 455/418 |
| 2005/0239446 | A1 * | 10/2005 | Tagawa et al. ............ | 455/414.1 |
| 2005/0239514 | A1 * | 10/2005 | Chiu .......................... | 455/567 |
| 2006/0031825 | A1 * | 2/2006 | Mulligan .................... | 717/168 |
| 2006/0126819 | A1 * | 6/2006 | Heimbecher ........... | 379/373.01 |
| 2006/0292980 | A1 * | 12/2006 | Marcos Alba .............. | 455/3.06 |

FOREIGN PATENT DOCUMENTS

| | | |
|---|---|---|
| EP | 1 182 848 A | 2/2002 |
| EP | 1 276 307 A | 1/2003 |
| JP | 2-22952 | 1/1990 |
| JP | 9-84139 | 3/1997 |
| JP | 11-113064 | 4/1999 |
| JP | 11-252221 | 9/1999 |
| JP | 2002-84347 | 3/2002 |
| JP | 2004-96386 | 3/2004 |

OTHER PUBLICATIONS

European Search Report dated Jun. 14, 2005.
Japanaese Office Action dated Apr. 17, 2007, with Partial English Translation.

* cited by examiner

*Primary Examiner*—Tan Trinh
(74) *Attorney, Agent, or Firm*—McGinn IP Law Group, PLLC (57) ABSTRACT

A portable terminal device capable of emitting a random ringtone, includes a call arrival processing device, in which a radio broadcast is set as one of the items of information indicating the type of ringtone in set data, and the frequency of radio broadcast signals set as a ringtone is detected out of the frequency information in the set data. If the power of the signals of this frequency is at or above a prescribed level, then signals of that frequency are fed to a loudspeaker to cause a radio broadcast to sound as a ringtone.

15 Claims, 5 Drawing Sheets

PORTABLE TERMINAL DEVICE

BACKGROUND OF THE INVENTION

1. Field of the Invention

The present invention relates to a portable terminal device, and more particularly to a portable terminal device capable of receiving radio broadcasts.

2. Description of the Related Art

In recent years, portable terminal devices including cellular phones, personal handy-phone systems (PHS) and personal digital assistants (PDA), which are equipped with not only a telephone function and an electronic mailing function but also the functions of electronic camera and Global Positioning System (GPS), have been introduced to the market. Portable terminal devices with a radio receiver function have also been developed (see Patent References 1 through 3 for instance).

When such a portable terminal device detects the arrival of a call or an electronic mail from another portable terminal device, it notifies its user of the arrival by having a loudspeaker to issue a ringtone. The ringtone is one selected in advance by the user out of a variety of ringtones whose data are stored in the device.

Patent Reference 1: Japanese Patent Application Laid-Open No. 2002-084347

Patent Reference 2: Japanese Patent Application Laid-Open No. 11(1999)-113064

Patent Reference 3: Japanese Patent Application Laid-Open No. 11(1999)-252221

However, conventional portable terminal devices can ring only a preset specific ringtone. Therefore, if the user wants to change the ringtone of his or her portable terminal device every time, he has to alter the setting of the ringtone of the portable terminal device every time.

SUMMARY OF THE INVENTION

An exemplary feature of the present invention, attempted in view of the exemplary problem noted above, is to provide a portable terminal device capable of issuing a random ringtone out of a variety of tones as a ringtone.

In order to solve the above and other exemplary problem stated above, according to the invention, there is provided a portable terminal device which communicates with another party by transmitting and receiving various signals with a base station by way of a wireless line, comprising call arrival detecting means for detecting an incoming call from another party via the base station; broadcast receiving means for receiving broadcast signals including audio signals; a loudspeaker for converting the audio signals into a sound; and call arrival processing means for causing the loudspeaker to emit a sound based on the broadcast signals when a call arrival from the other party is detected by the call arrival detecting means. Therefore, when a signal is received from another party, the portable terminal device emits the sound of a radio broadcast or TV broadcast from its loudspeaker.

In the portable terminal device described above, the call arrival processing means may cause the loudspeaker to emit a sound based on the broadcast signals when the call arrival detecting means detects a call arrival signal from the base station. This would enable the portable terminal device, upon arrival of a call initiated by another party, to emit the sound of a radio broadcast or TV broadcast from its loudspeaker.

In the portable terminal device, the call arrival processing means may cause the loudspeaker to emit a sound based on the broadcast signals when the call arrival detecting means detects the reception of an electronic mail from the other party. This would enable the portable terminal device, upon reception of an electronic mail from another party, to emit the sound of a radio broadcast or TV broadcast from its loudspeaker.

The portable terminal device may be further provided with first memory means for storing a preset frequency of broadcast signals to be received by the broadcast receiving means, wherein the call arrival processing means may cause the loudspeaker to emit a sound based on the broadcast signals of the frequency stored in the first memory means. This would enable the portable terminal device to cause the loudspeaker to emit a sound based on radio or TV broadcast signals of a preset frequency.

The portable terminal device may be further provided with second memory means for storing audio signals, wherein the call arrival processing means may cause the loudspeaker to emit a sound based on the audio signals stored in the second memory means when the power of the broadcast signals received by the broadcast receiving means is below a prescribed level.

The portable terminal device may be further provided with incoming call's other party device identifying means, wherein the call arrival processing means, when the call arrival detecting means detects a call arrival signal from the base station and the incoming call's other party device identifying means detects that the other party sending the incoming call is a preset designated device, may cause a sound based on the broadcast signals to be emitted from the loudspeaker. This would enable the portable terminal device, when it receives a call initiated by a preset designated device, to cause the loudspeaker to emit a radio broadcast or TV broadcast sound.

The portable terminal device may be further provided with incoming call's other party device identifying means, wherein the call arrival processing means, when the call arrival detecting means detects the reception of an electronic mail from the other party and the incoming call's other party device identifying means detects that the other party sending the received mail is a preset designated device, may cause a sound based on the broadcast signals to be emitted from the loudspeaker. This would enable the portable terminal device, when it receives an electronic mail from a preset designated device, to cause the loudspeaker to emit a radio broadcast or TV broadcast sound.

The first memory means may also be storing another preset frequency of broadcast signals to be received by the broadcast receiving means. And, the call arrival processing means may cause the loudspeaker to emit a sound based on the broadcast signals of said another frequency stored in the first memory means when the power of the broadcast signals received by the broadcast receiving means is below a prescribed level.

According to the invention, there is provided a portable terminal device which communicates with another party by transmitting and receiving various signals with a base station by way of a wireless line, comprising a call arrival detecting device that detects an incoming call from another party via the base station; a broadcast receiving circuit that receives broadcast signals including audio signals; a loudspeaker for converting the audio signals into a sound; and a call arrival processing device for causing the loudspeaker to emit a sound based on the broadcast signals when a call arrival from the other party is detected by the call arrival detecting device. Therefore, when a signal is received from another party, the portable terminal device emits the sound of a radio broadcast or TV broadcast from its loudspeaker.

In the portable terminal device described above, the call arrival processing device may cause the loudspeaker to emit a sound based on the broadcast signals when the call arrival detecting device detects a call arrival signal from the base station. This would enable the portable terminal device, upon arrival of a call initiated by another party, to emit the sound of a radio broadcast or TV broadcast from its loudspeaker.

In the portable terminal device, the call arrival processing device may cause the loudspeaker to emit a sound based on the broadcast signals when the call arrival detecting device detects the reception of an electronic mail from the other party. This would enable the portable terminal device, upon reception of an electronic mail from another party, to emit the sound of a radio broadcast or TV broadcast from its loudspeaker.

The portable terminal device may be further provided with a first memory device for storing a preset frequency of broadcast signals to be received by the broadcast receiving circuit, wherein the call arrival processing device may cause the loudspeaker to emit a sound based on the broadcast signals of the frequency stored in the first memory device. This would enable the portable terminal device to cause the loudspeaker to emit a sound based on radio or TV broadcast signals of a preset frequency.

The portable terminal device may be further provided with a second memory device for storing audio signals, wherein the call arrival processing device may cause the loudspeaker to emit a sound based on the audio signals stored in the second memory device when the power of the audio signals received by the broadcast receiving circuit is below a prescribed level.

The portable terminal device may be further provided with a third memory device for storing other party identifying data indicating that the incoming call's other party is a preset designated device, wherein the call arrival processing device may cause the loudspeaker to emit a sound based on the broadcast signals when the call arrival detecting device detects a call arrival signal from the base station and identifying data contained in the incoming call are contained in the other party identifying data stored in the third memory device. This would enable the portable terminal device, when it detects the reception of a call initiated at a preset designated device, to cause the loudspeaker to emit a radio broadcast or TV broadcast sound.

The portable terminal device may be further provided with a third memory device for storing other party identifying data indicating that the incoming call's other party is a preset designated device, wherein the call arrival processing device may cause the loudspeaker to emit a sound based on the broadcast signals when the call arrival detecting device detects the reception of an electronic mail from the base station and identifying data contained in the received mail are contained in the other party identifying data stored in the third memory device. This would enable the portable terminal device, when it receives an electronic mail from a preset designated device, to cause the loudspeaker to emit a radio broadcast or TV broadcast sound.

The first memory device may also be storing another preset frequency of broadcast signals to be received by the broadcast receiving circuit. And, the call arrival processing device may cause the loudspeaker to emit a sound based on the broadcast signals of said another frequency stored in the first memory device when the power of the broadcast signals received by the broadcast receiving circuit is below a prescribed level.

BRIEF DESCRIPTION OF THE DRAWINGS

The above and other exemplary, features, purposes, and advantages of the present invention will become more apparent from the following detailed description when taken in conjunction with the accompanying drawings wherein.

DETAILED DESCRIPTION OF THE EXEMPLARY EMBODIMENTS

The configuration of a first exemplary embodiment of the present invention will be described in detail below with reference to FIG. 1 and FIG. 2.

Figure 1:
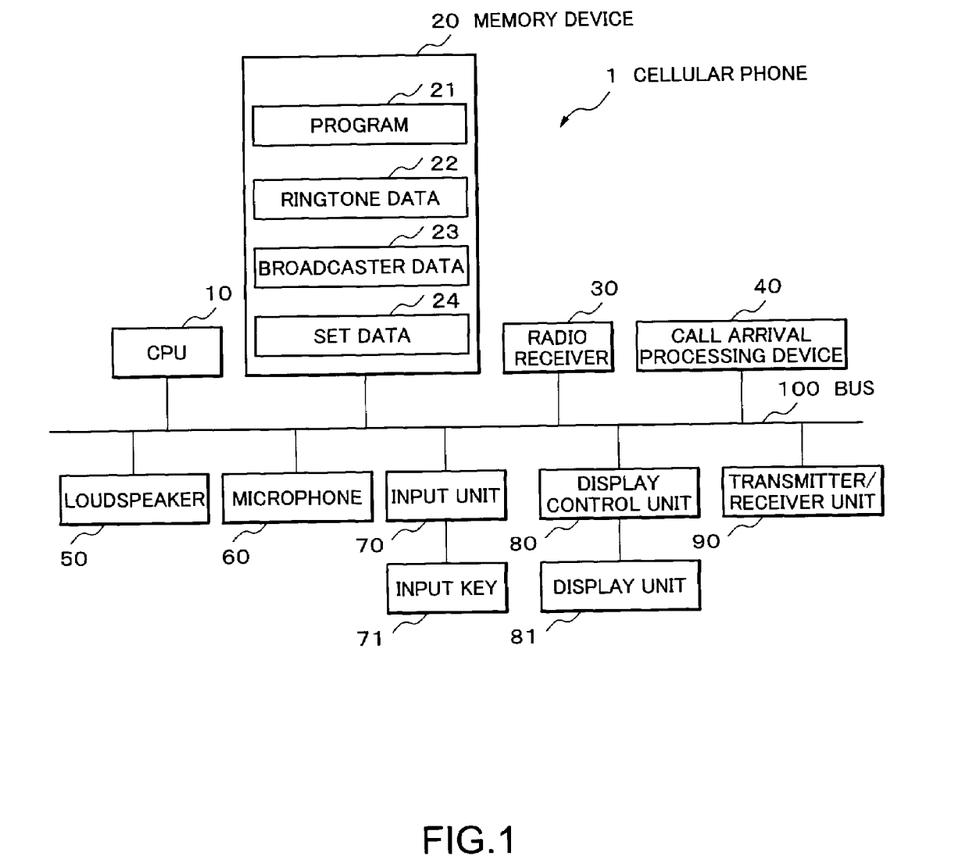
FIG. 1 is a block diagram showing the configuration of a cellular phone, which is a first exemplary embodiment of the invention.
Figure 2:
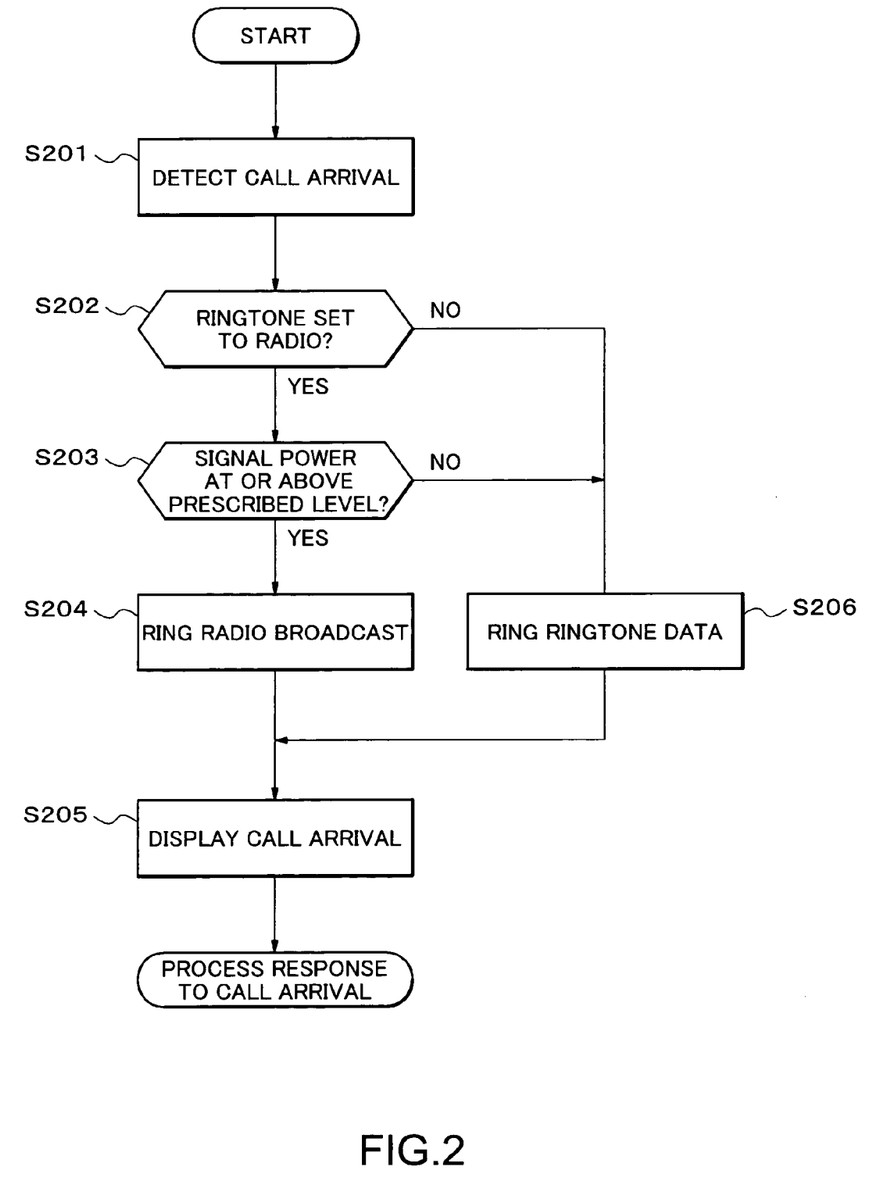
FIG. 2 is a flow chart showing the flow of call arrival processing in the cellular phone, which is the first exemplary embodiment of the invention.

FIG. 1 is a block diagram showing the configuration of the cellular phone, which is the first exemplary embodiment of the invention. A cellular phone 1 according to the invention is provided with a central processing unit (CPU) 10, a memory device 20, a radio receiver 30, a call arrival processing device 40, a loudspeaker 50, a microphone 60, an input unit 70, a display control unit 80 and a transmitter/receiver unit 90. These constituent elements are connected by a bus 100.

The CPU 10 controls the constituent elements of the cellular phone 1 and receives various data from them. The CPU 10 computes these-data by actuating a program 21 stored in the memory device 20 to be described afterwards, and supplies the results of this computation to the memory device 20 or other constituent elements mentioned above. These coordinated actions of hardware and software (call arrival detecting device) realize the functions of the cellular phone 1 including call arrival detection, telephone communication and electronic mailing.

The memory device 20 is configured of a well-known memory device, such as a read only memory (ROM) or a random access memory (RAM). The memory device 20 stores at least the program 21 for achieving various functions of the cellular phone 1 including telephone communication, electronic mailing and ringtone setting, ringtone data 22, broadcaster data 23 regarding the frequencies of different radio stations and set data 24. The ringtone data 22 in this context are data of the ringtone to be emitted from the loudspeaker 50 to inform the user of the arrival of a call or an electronic mail from another portable terminal device. The set data 24 are data regarding the ringtone to be emitted from the loudspeaker 50 when a call or an electronic mail arrives from another portable terminal device. The ringtone data 22 may include a plurality of ringtones. The ringtone data 22 may be downloaded from outside via the transmitter/receiver unit 90.

The set data 24 comprise at least information indicating the type of ringtone, frequency information, ringtone information, and second ringtone information. The information indicating the type of ringtone indicates whether the ringtone emitted by the loudspeaker 50 is one of radio broadcast or one of the ringtone data 22. The frequency information indicates the frequency of the radio broadcast where the ringtone is a sound of a radio broadcast. The ringtone information indicates which of the ringtones contained in the ringtone data 22 is one of the ringtone data 22. The second ring tone information indicates the ringtone contained in the ringtone data 22 to be emitted where the signal power of the radio broadcast is less than a prescribed level.

The user, using the input unit 70, sets the set data 24 containing these items of information. More specifically, the information indicating the type of ringtone is set when the user selects either a sound of radio broadcast or one of the ringtone data 22. The frequency information is relevant only when the sound of radio broadcast is selected as a ringtone. The user, upon selecting the radio station of his or her preference, references the broadcaster data 23 and sets frequency information. Alternatively, the user may directly enter the frequency of the radio station of his or her choice. The ringtone information is set when the user selects a ringtone of his or her preference out of the ringtones contained in the ringtone data 22. The user sets the second ringtone information by selecting a ringtone of his or her preference out of the ringtones contained in the ringtone data 22.

The radio receiver 30 is a circuit for receiving audio signals of a radio broadcast, such as AM broadcast, FM broadcast or the like, or of terrestrial waves or broadcast satellite (BS) TV broadcast. This radio receiver 30 also measures the power of received signals, and sends this power information to the call arrival processing device 40.

An antenna may be provided as required, and this radio receiver 30 may be connected to this antenna. In this way, various signals can be received with higher sensitivity.

The call arrival processing device 40 sets a ringtone to be emitted from the loudspeaker 50 when an incoming call is detected, such as the arrival of an external call or an electronic mail from another portable terminal device, on the basis of the set data 24 stored in the memory device 20. The call arrival processing device 40 also processes incoming calls, such as responding to call arrivals. The operations by the call arrival processing device 40 described above may also be performed by the CPU 10.

The loudspeaker 50, which may be any appropriate known loudspeaker, converts, various signals including audio signals received from another portable terminal device, the ringtone data 22 stored in the memory device 20 and audio signals received by the radio receiver 30, into sound. This loudspeaker 50 may be either the same loudspeaker by which the user hears the other party's voice or another one separate from that.

The microphone 60 converts the voice of the user or the like into audio signals.

The input unit 70 is for any input entered by the user by manipulating an input key 71, including any appropriate known input tool such as a key, button or jog shuttle.

The display control unit 80 is a control circuit for controlling displays by a display unit 81 which may be any appropriate display device, such as a liquid crystal display (LCD) or an electro-luminescence (EL) display.

The transmitter/receiver unit 90 communicates via a wireless line with a base station to perform transmission/reception of signals, such as initiated calls, incoming calls, audio signals and data. The processing of these signals by the CPU 10 in accordance with the program 21 as described above makes possible a telephone call with an external device such as a portable terminal device, fixed telephone set or computer, and transmission/reception of an electronic mail.

The base station here is connected to other base stations by various communication lines, such as a telephone network or the Internet. As various signals are exchanged between the base station, with which the cellular phone 1 communicates via a wireless line, and another base station which communicates with an external device, a telephone call or data communication between the cellular phone 1 and the external device is realized.

Next, call arrival processing by the cellular phone, which is the first exemplary embodiment of the invention will be described with reference to FIG. 2. FIG. 2 is a flow chart showing the flow of call arrival processing in this cellular phone.

First, when a call arrival from an external device or the reception of an electronic mail is detected (step S201) as the CPU 10 analyzes a signal received by the transmitter/receiver unit 90 from the base station, the call arrival processing device 40 refers to the information indicating the type of ringtone in the set data 24 and detects the presence or absence of ringtone setting to a radio broadcast (step S202).

If the ringtone is set to a radio broadcast (YES at step S202), then the call arrival processing device 40 will acquire from the frequency information in the set data 24 the frequency of the signals of a radio broadcast set as the ringtone, and set it into the radio receiver 30. The call arrival processing device 40 acquires from the radio receiver 30 the power of the signals to be received by the radio receiver 30, and judges whether or not the power of the signals of this frequency is at or above a prescribed level (step S203).

On the other hand, if the ringtone is not set to a radio broadcast (NO at step S202), then the call arrival processing device 40 will acquire from the ringtone information in the set data 24 a ringtone out of those set as ringtones in the ringtone data 22, and cause this ringtone to be emitted from the loudspeaker 50 (step S206).

If the signal power of the radio broadcast of the set frequency is at or above a prescribed level (YES at step S203), then the call arrival processing device 40 will cause signals of the radio broadcast of that frequency to be emitted from the loudspeaker 50 (step S204).

On the other hand, if the signal power of the radio broadcast of the set frequency is below the prescribed level (NO at step S203), then the call arrival processing device 40 will acquire a ringtone in the ringtone data 22 set in the second ringtone information in the set data 24, and cause this ringtone to be emitted from the loudspeaker 50 (step S206).

When a ringtone is emitted from the loudspeaker 50, the display control unit 80 causes the display unit 81 to give a display indicating the detection of an incoming call, such as a call arrival from outside or the reception of an electronic mail (step S205).

Incidentally, this display may be given either at the same time as or before the issuance of the ringtone.

When a display indicating an incoming call is given on the display unit 81, the call arrival processing device 40 processes the call arrival by responding to the incoming call in case of "hooking off" the telephone receiver by the user or performing an automatic answering function.

The ringtone is rung for a prescribed duration, including the case in which the ringtone is the sound of a radio broadcast. It is rung until, for instance, the user "hooks off" the telephone receiver (connects the telephone line) or until, where the user does not hookoff the receiver, automatic answering function starts working. If an electronic mail is received, then the ringtone will be rung for a predetermined duration.

The operations of the call arrival processing device 40 described above can also be performed by the CPU 10.

Thus according to the invention, as it is made possible to ring a ringtone which differs every time by setting a radio broadcast as the ringtone, the trouble can be saved of setting the ringtone every time when it is desired to alter the ringtone every time.

Also according to the invention, since it is not necessary to store in the memory device 20 data on many different ringtones in order to alter the ringtone every time, there is no need to increase the capacity of the memory device 20 for storing ringtones.

Further according to the invention, even when no radio broadcast can be received, a ringtone can still be rung by sounding a ringtone stored in advance in the memory device 20 for use in case the signal power of the radio broadcast to be received is too weak.

The configuration of a second exemplary embodiment of the present invention will now be described with reference to FIG. 3 and FIG. 4.

Figure 3:
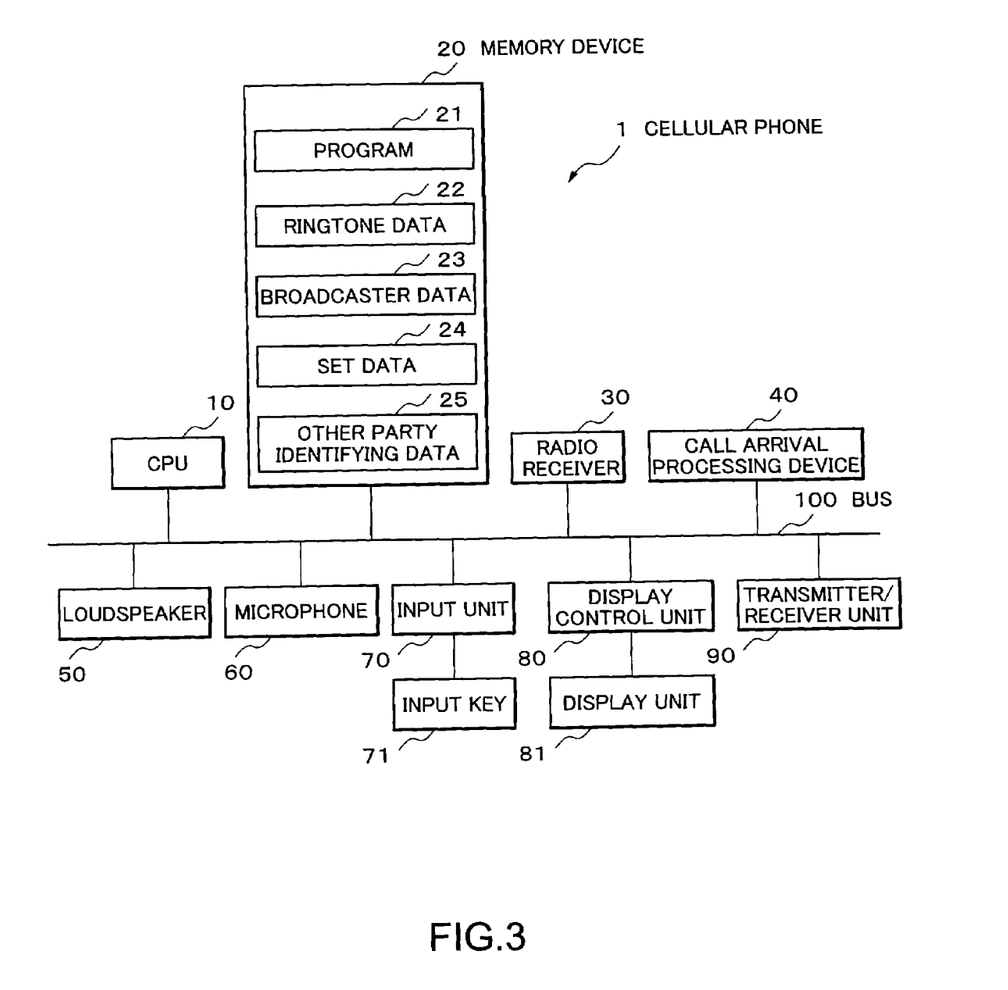
FIG. 3 is a block diagram showing the configuration of a cellular phone, which is a second exemplary embodiment of the invention.
Figure 4:
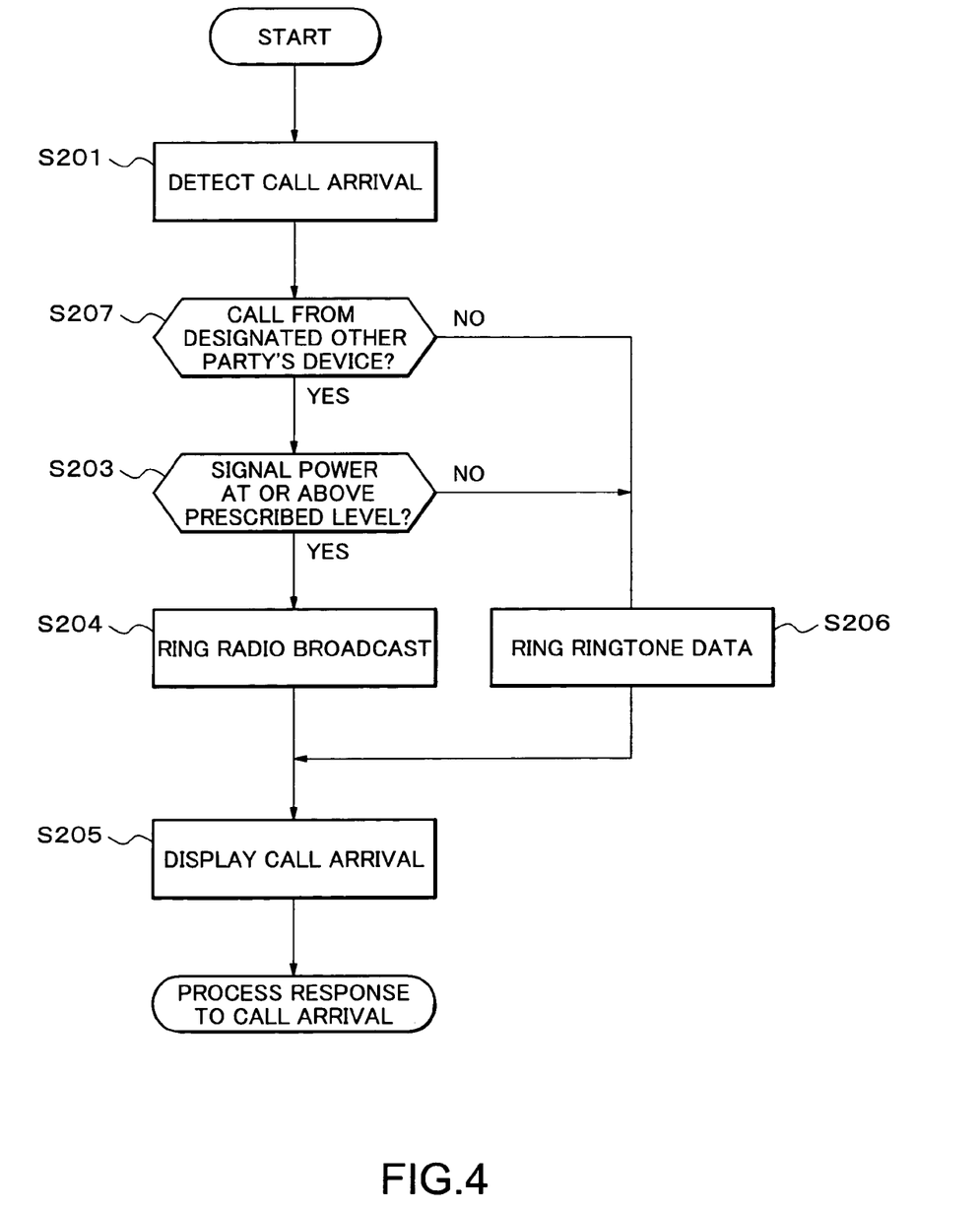
FIG. 4 is a flow chart showing the flow of call arrival processing in the cellular phone, which is the second exemplary embodiment of the invention.

FIG. 3 is a block diagram showing the configuration of a cellular phone, which is the second exemplary embodiment of the invention. The cellular phone 1 embodying the invention in this second mode differs from the first embodiment only in that the memory device 20 further includes other party identifying data 25, but is the same in all other aspects of configuration. Therefore, description of any other part than the different part is omitted.

The memory device 20 further stores the other party identifying data 25. The other party identifying data 25 in this context are data for identifying a pre-designated other party or a specific group including a pre-designated other party: Such data may be, for instance, the telephone number and/or the electronic mail address of the other party, or a set of a plurality of telephone numbers and/or electronic mail addresses including the telephone number and/or the electronic mail address of each individual other party.

The user can set the other party identifying data 25 from the input unit 70. Further, the other party identifying data 25 may as well be a telephone directory or a mail address book.

Next, call arrival processing by the cellular phone, which is the second exemplary embodiment of the invention, will be described with reference to FIG. 4. FIG. 4 is a flow chart showing the flow of call arrival processing in this cellular phone.

The call arrival processing by the second exemplary embodiment of the invention differs from that by the first embodiment only in that step S202 of call arrival processing by the cellular phone embodying the invention in the first mode is replaced by step S207 of judging whether or not an incoming call is from a designated other party. Therefore, description of any other part than the different part is omitted.

First, when a call arrival from the external device or the reception of an electronic mail is detected (step S201) as the CPU 10 analyzes a signal received by the transmitter/receiver unit 90 from the base station, the call arrival processing device 40 refers to the other party identifying data 25 in the set data 24 and detects the presence or absence of data identifying the other party to the incoming call such as a call arrival or the reception of an electronic mail in the other party identifying data 25 (step S207).

If data identifying the other party in the incoming call such as a call arrival or the reception of an electronic mail are found in the other party identifying data 25, namely if, for instance, the telephone number and/or the electronic mail address of the other party are found in the other party identifying data 25 (YES at step S207), the call arrival processing device 40 acquires from the frequency information in the set data 24 the frequency of the signals of the radio broadcast set as the ringtone and sets it in the radio receiver 30. The call arrival processing device 40 acquires from the radio receiver 30 the power of the signals to be received by the radio receiver 30, and judges whether or not the power of the signals of this frequency is at or above a prescribed level (step S203).

On the other hand, if data identifying the other party in the incoming call such as a call arrival or the reception of an electronic mail are not found in the other party identifying data 25, namely if for instance the telephone number and/or the electronic mail address of the other party are not found in the other party identifying data 25 (NO at step S207), the call arrival processing device 40 will acquire a ringtone in the ringtone data 22 set in the second ringtone information in the set data 24, and cause this ringtone to be emitted from the loudspeaker 50 (step S206). The operations of the call arrival processing device 40 described above can also be performed by the CPU 10.

Figure 5:
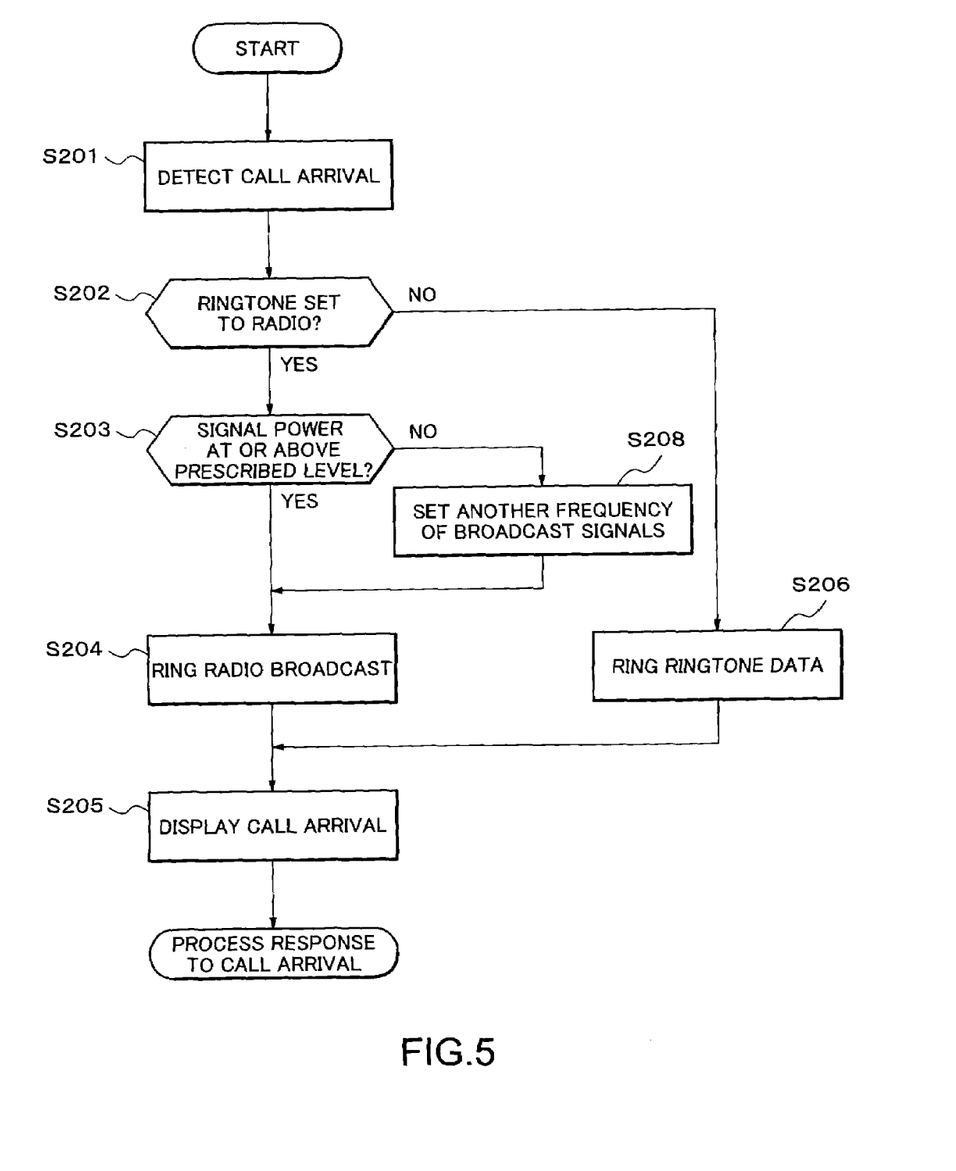
FIG. 5 is a flow chart showing the flow of call arrival processing in the cellular phone, which is the third exemplary embodiment of the invention.

The configuration of a third exemplary embodiment of the present invention will now be described with reference to FIG. 5.

The configuration of a cellular phone embodying the invention in this third mode is the same as the configuration of a cellular phone embodying the invention in this first mode. Therefore, description of the configuration of a third exemplary embodiment of the invention is omitted. However, the frequency information set in the set data 24 includes each frequency data of the plural radio broadcast where the ringtone is a sound of a radio broadcast.

Next, call arrival processing by the cellular phone, which is the third exemplary embodiment of the invention, will be described with reference to FIG. 5. FIG. 5 is a flow chart showing the flow of call arrival processing in this cellular phone.

The call arrival processing by the third exemplary embodiment of the invention differs from that by the first embodiment only in the following. If the signal power of the radio broadcast of the set frequency is below the prescribed level (NO at step S203), then the call arrival processing device 40 will acquire from the frequency information in the set data 24 another frequency of signals of a radio broadcast set as the ringtone (step S208), and set it into the radio receiver 30. Therefore, description of any other part than the different part is omitted.

The call arrival processing device 40 may judge whether or not the power of the signals of this frequency is at or above a prescribed level. If the signal power of the radio broadcast of this frequency is below the prescribed level, then the call arrival processing device 40 may acquire from the frequency information in the set data 24 next frequency of signals of a radio broadcast set as the ringtone, and set it into the radio receiver 30.

According to the invention, a ringtone can still be rung by emitting the sound of another radio broadcast from the loudspeaker 50 in case the signal power of one radio broadcast to be received is too weak.

While a radio broadcast is set in the information indicating the type of ringtone in the set data 24 as the ringtone to be rung in the first exemplary embodiment of the invention, in this second embodiment a radio broadcast is sounded when a call initiated, or an electronic mail sent, by a pre-designated other party or another party in a pre-designated specific group, is received.

According to the invention, a random ringtone can be rung only when a telephone call arrives or an electronic mail is received from a specified other party.

Incidentally, though the foregoing description referred to a cellular phone as an example of portable terminal device, the invention can be applied to any device that has a function to ring a ringtone to make known an incoming call or a received electronic mail and a radio broadcast receiving function, even if it is not a cellular phone. Thus, the invention is applicable to many different portable terminal devices including PHS and PDA.

Further, though according to the invention described above a radio broadcast of a frequency preset in the frequency information in the set data 24 is supposed to be sounded, any of the broadcasting stations stored in the broadcaster data 23 can be selected at random and sounded. This would make possible ringing of a more random ringtone.

According to the invention, since a sound based on a broadcast signal is emitted from the loudspeaker, a random ringtone can be rung at any time.

Also according to the invention, as a sound based on an audio signal stored in second storage means is emitted from the loudspeaker when no broadcast signal at or above a prescribed signal power can be received, a ringtone can be rung even when no radio broadcast or TV broadcast can be received.

Further according to the invention, it is made possible to ring a random ringtone only when a call arrives or an electronic mail is received from a specific other party.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included with the spirit and scope of the following claims.

Further, the inventor's intent is to retain all equivalents even if the claims are amended during prosecution.

What is claimed is:

1. A method for automatically generating random ringtones in a portable terminal device, said method comprising:
    providing a receiver in said portable terminal device to receive signals from a local broadcasting station;
    using audio signals received from said local broadcasting station as a ringtone for incoming calls;
    retrieving, from a memory device in said portable terminal device, a frequency at which said local broadcasting station broadcasts; and
    tuning said receiver to said frequency.

2. A method for automatically generating random ringtones in a portable terminal device, said method comprising:
    providing a receiver in said portable terminal device to receive signals from a local broadcasting station;
    using audio signals received from said local broadcasting station as a ringtone for incoming calls,
    wherein said automatically generating random ringtones is selectively enabled instead of a normal ringtone; and
    determining whether said normal ringtone or the automatically generated random ringtone is used for an incoming call,
        wherein said determining which ringtone is used comprises:
            determining a strength of a signal received from said local broadcasting station; and
            using said received audio as a ringtone for incoming calls only if said strength exceeds a predetermined threshold and a user has enabled said automatically generating a random ringtone.

3. A method for automatically generating random ringtones in a portable terminal device, said method comprising:
    determining a strength of a signal received from a local broadcasting station; and
    using audio signals received from said local broadcasting station as a ringtone for incoming calls if said strength exceeds a predetermined threshold.

4. The method of claim 3, further comprising:
    using an audio signal stored in a memory of the portable terminal device as the ringtone for incoming calls only if the strength does not exceed the predetermined threshold.

5. The method of claim 3, further comprising:
    retrieving, from a memory device in the portable terminal device, a frequency at which the local broadcasting station broadcasts; and
    tuning the receiver to the frequency.

6. The method of claim 3, wherein the ringtone is randomly generated after receiving the incoming call.

7. The method of claim 3, further comprising:
    determining an identification of a calling party;
    using the received audio as a ringtone for an incoming call only if the calling party identification matches an identification pre-stored in a memory device; and
    using an audio signal stored in the memory device of the portable terminal device as the ringtone for the incoming call only if the calling party identification does not match the identification pre-stored in a memory device.

8. A computer readable medium encoded with a program executed by a computer for causing a central processing unit (CPU) to perform operations comprising:
    determining a strength of a signal received from a local broadcasting station; and
    using audio signals received from said local broadcasting station as a ringtone for incoming calls only if said strength exceeds a predetermined threshold.

9. The computer readable medium of claim 8, wherein the operations further comprise:
    using an audio signal stored in a memory of the portable terminal device as the ringtone for incoming calls only if the strength does not exceed the predetermined threshold.

10. The computer readable medium encoded with program embodied on the computer for causing the CPU to perform operations of claim 8, further comprising:
    retrieving, from a memory device in the portable terminal device, a frequency at which the local broadcasting station broadcasts; and
    tuning the receiver to the frequency.

11. The computer readable medium of claim 8, wherein the ringtone is randomly generated after receiving the incoming call.

12. The computer readable medium of claim 8, wherein the operations further comprise:
    determining an identification of a calling party;
    using the received audio as a ringtone for an incoming call only if the calling party identification matches an identification pre-stored in the memory device; and
    using an audio signal stored in the memory device of the portable terminal device as the ringtone for the incoming call only if the calling party identification does not match an identification pre-stored in the memory device.

13. A method for automatically generating random ringtones in a portable terminal device, said method comprising:

providing a receiver in said portable terminal device to receive signals from a local broadcasting station;
using audio signals received from said local broadcasting station as a ringtone for incoming calls;
determining a strength of a signal received from the local broadcasting station; and
using the received audio as a ringtone for incoming calls only if the strength exceeds a predetermined threshold.

14. A method for automatically generating random ringtones in a portable terminal device, said method comprising:
providing a receiver in said portable terminal device to receive signals from a local broadcasting station;
using audio signals received from said local broadcasting station as a ringtone for incoming calls;
determining a strength of a signal received from the local broadcasting station; and
using an audio signal stored in a memory of the portable terminal device as a ringtone for incoming calls only if the strength does not exceed a predetermined threshold.

15. A method for automatically generating random ringtones in a portable terminal device, said method comprising:
providing a receiver in said portable terminal device to receive signals from a local broadcasting station;
using audio signals received from said local broadcasting station as a ringtone for incoming calls,
wherein said automatically generating random ringtones is selectively enabled instead of a normal ringtone;
determining whether said normal ringtone or the automatically generated random ringtone is used for an incoming call,
wherein said determining which ringtone is used comprises:
determining an identification of a calling party; and
using said received audio as a ringtone for an incoming call only if said calling party identification matches an identification pre-stored in a memory device and a user has enabled said automatically generating a random ringtone; and
using an audio signal stored in the memory device of the portable terminal device as the ringtone for the incoming call only if the calling party identification does not match the identification pre-stored in the memory device.

* * * * *